Dec. 16, 1924.                    S. N. NORTH                    1,519,697
PISTON RING
Filed Oct. 24, 1923
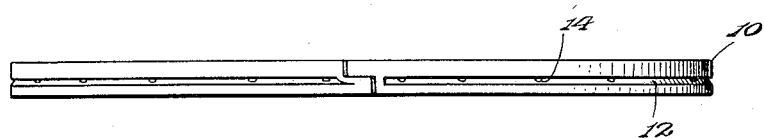
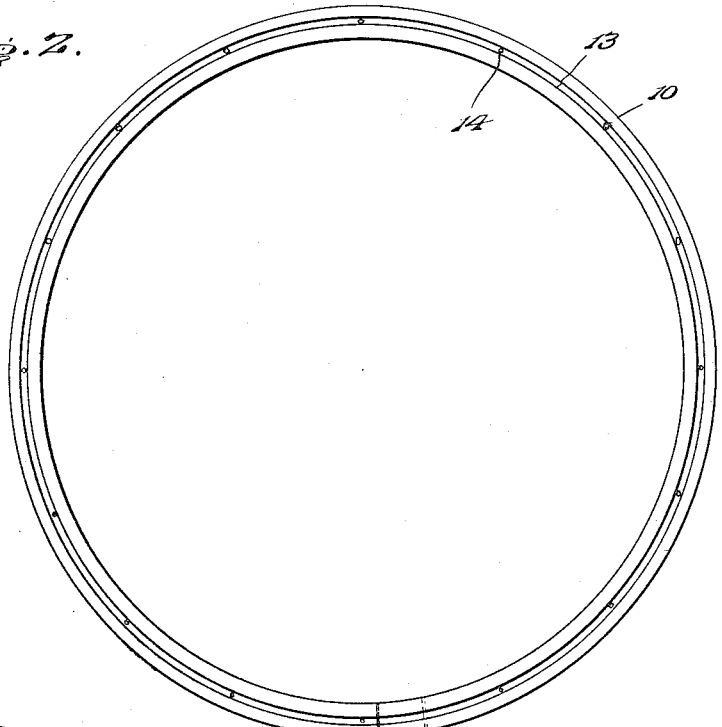
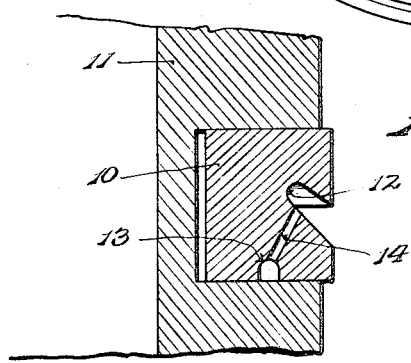

Patented Dec. 16, 1924.

1,519,697

UNITED STATES PATENT OFFICE.

SAMUEL N. NORTH, OF TOLEDO, OHIO.

PISTON RING.

Application filed October 24, 1923. Serial No. 670,522.

*To all whom it may concern:*

Be it known that I, SAMUEL N. NORTH, a citizen of the United States, residing at Toledo, in the county of Lucas and State of Ohio, have invented certain new and useful Improvements in Piston Rings, of which the following is a specification.

This invention relates to an improved piston ring for internal combustion engines and seeks, among other objects, to provide a ring which will minimize the lifting of oil into the combustion chamber of an engine cylinder by the piston.

The invention seeks as a further object, to provide a ring which will function to scrape excess oil from the cylinder wall on the down-stroke of the piston and retain such excess oil to be returned to the wall of the cylinder on the up-stroke, thus preventing the lifting of oil into the combustion chamber of the cylinder while obviating the possibility of depriving the cylinder wall of sufficient lubricant.

The invention seeks, as another object, to provide a ring which will function to retain the excess oil which passes around behind the ring on the down-stroke of the piston and return such excess oil to the wall of the cylinder on the up-stroke of the piston, thus preventing the lifting of oil into the combustion chamber of the cylinder while obviating the possibility of depriving the cylinder wall of any less lubricant than the conventional type of ring.

And the invention seeks, as a still further object, to provide a ring which may be readily installed upon engine pistons as now constructed.

Other and incidental objects will appear hereinafter.

In the drawings:

Figure 1 is an edge elevation of my improved piston ring.

Figure 2 is a bottom plan view of the device, and

Figure 3 is an enlarged detail sectional view showing the ring in connection with a conventional piston.

In carrying the invention into effect, I employ a split resilient ring 10, the ends of which may, as shown in Figure 1 of the drawings, be provided with a lap joint. The ring is slightly oblong in cross section, being provided with flat inner and outer faces as well as flat top and bottom faces, and is, as shown in detail in Figure 3, adapted to snugly fit in one of the customary ring grooves of an engine piston, a portion of a piston being conventionally illustrated at 11. Formed in the outer face of the ring is an upwardly and inwardly inclined groove 12 which is preferably disposed at an angle of substantially forty-five degrees with respect to the top and bottom faces of the ring and, as brought out in Figure 3, said groove is slightly widened toward the mouth thereof. However, the side walls of the groove may be parallel. The mouth of the groove is preferably disposed below the horizontal center line of the ring so that at the outer periphery of the ring a somewhat wider face is defined above the groove than below the groove. As will be observed, these faces are smooth and uninterrupted so that the lower face will seat against the wall of the cylinder to provide a seal below the groove while the upper face will likewise seat against the wall of the cylinder to provide a similar seal of increased width above the groove, the wider seal being designed to overcome the escape of oil upwardly past the ring. Formed in the bottom face of the ring medially thereof is an annular groove 13 and connecting the groove 12 with the groove 13 is a plurality of circumferentially spaced oil passages 14 inclining downwardly and inwardly from their upper ends toward their lower ends, said passages having their upper ends disposed at or near the inner extremity of the groove 12 and their lower ends entering the groove 13 at the top thereof.

As will now be seen in view of the foregoing, when the piston 11 moves downwardly in the cylinder, excess oil on the cylinder wall will be scraped therefrom and collected in the groove 12 and it has been found by test that by tilting this groove at an angle of substantially forty-five degrees, the groove forms a pocket which will, during the downward stroke of the piston, retain the oil collected therein. Accordingly, after the piston has started downwardly, any oil entering the groove 12 will remain therein until the piston has reached the bottom of its stroke, the advantage of this feature lying in the fact that the oil will not, during the downward stroke of the piston, surge from the groove 12 to be discharged against the wall of the cylinder and thus possibly find its way upwardly past the ring to be ultimately lifted into the combustion chamber of the cylinder. Assuming that the ring fits snugly in the ring groove of the piston and that the bottom face of the ring lies flat throughout its length against the bottom wall of the ring groove so that a seal is maintained between the ring and the bottom wall of the ring groove, oil collected in the groove 12 will, upon the upward stroke of the piston, be discharged from said groove back through the mouth of the groove against the wall of the piston. However, should the ring be worn or the bottom wall of the ring groove be irregular, to thus permit a flow of oil beneath the ring, oil in the groove 12 will, upon the up-stroke of the piston, be discharged downwardly through the passages 14 into the groove 13 and thence outwardly beneath the ring to the wall of the cylinder. Where the ring is loose, oil scraped from the cylinder wall by the lower outer corner of the ring, will, of course, be directed into the ring groove of the piston beneath the ring. However, such oil will be caught and retained in the groove 13 and filling this groove will flow upwardly through the passages 14 into the groove 12 to be retained thereby. Upon the up-stroke of the piston, the oil will then be discharged downwardly partly through the mouth of the groove 12 and partly through the passages 14 and groove 13 to emerge beneath the ring against the cylinder wall. Thus, whether the ring be new or worn, or whether the ring fits tightly or more or less loosely in the ring groove of the piston, the oil collected from the cylinder wall will be returned to said wall at the proper time to thus avoid faulty lubrication of the cylinder while oil will be gathered from the cylinder wall at the proper time to prevent lifting of the oil into the combustion chamber of the cylinder incident to the reciprocation of the piston.

Having thus described the invention, what is claimed as new is:

1. A split resilient piston ring having an oblique oil groove in its outer face disposed at an obtuse angle to the top face of the ring to form an oil pocket, an oil groove in the bottom face of the ring, and passages in the ring connecting said grooves.

2. A split resilient piston ring having a tilted oil groove in its outer face rising from the mouth thereof in the direction of the top face of the ring to form an oil pocket, an oil groove in the bottom face of the ring, and passages in the ring connecting said grooves.

3. In a split resilient piston ring, the combination of an oil groove in the outer face of the ring having its depth extending above the mouth of the groove to form an oil pocket, an oil groove in the bottom face of the ring, and passages in the ring connecting said grooves.

4. A split resilient piston ring provided at its lower outer corner with a scraping edge and formed in its outer face with an oil groove having its depth extending above the mouth of the groove, an oil groove in the bottom face of the ring, and passages in the ring connecting said grooves.

5. In a solid one-piece split resilient piston ring, the combination of an oil groove in the bottom face of the ring, an oil groove in the outer face of the ring having its depth extending above the mouth of such groove to form an oil pocket, and passages in the ring connecting said grooves.

6. In a solid one-piece split resilient piston ring, the combination of an oil groove in the bottom face of the ring, an oil groove in the outer face of the ring having its depth extending above the mouth of such groove to form an oil pocket, passages in the ring connecting said grooves, and a scraping edge at the lower outer corner of the ring whereby oil will be sheared from the cylinder wall by said edge and excess oil traveling beneath the ring bypassed through the groove in the bottom face of the ring and through said passages into the groove in the outer face of the ring to be retained within the latter groove during the downward travel of a piston and subsequently discharged against the cylinder wall and returned below said ring when the piston travels upwardly.

In testimony whereof I affix my signature.

SAMUEL N. NORTH. [L. S.]